United States Patent [19]

Gutman

[11] Patent Number: 5,757,882
[45] Date of Patent: May 26, 1998

[54] STEERABLE X-RAY OPTICAL SYSTEM

[75] Inventor: George Gutman, Birmingham, Mich.

[73] Assignee: Osmic, Inc., Troy, Mich.

[21] Appl. No.: 574,249

[22] Filed: Dec. 18, 1995

[51] Int. Cl.$^6$ ..................................... G21K 1/06
[52] U.S. Cl. ..................................... 378/84; 378/82
[58] Field of Search ................... 378/84, 85, 82

[56] References Cited

U.S. PATENT DOCUMENTS

| | | | |
|---|---|---|---|
| 4,525,853 | 7/1985 | Keem | 378/83 |
| 4,675,889 | 6/1987 | Wood et al. | |
| 4,698,833 | 10/1987 | Keem et al. | |
| 4,958,363 | 9/1990 | Nelson et al. | 378/85 |
| 5,163,078 | 11/1992 | Iketaki | |
| 5,384,817 | 1/1995 | Crowther et al. | |

OTHER PUBLICATIONS

*Monochromatization by Multilayered Optics on a Cylinder Reflector and on an Ellipsoidsoidal Focusing Ring*, Gerald F. Marshall, Optical Engineering, Aug. 1986, vol. 25 No. 8.
*Layered Synthetic Microstructures as Optical Elements for the Extreme Ultraviolet and Soft X–Rays*, Purushottam Chakraborty, International Journal of Modern Physics B, vol. 5, No. 13 (1991) 2133-2228, World Scientific Publishing Company.
*New Method for Achieving Accurate Thickness Control for Uniform and Graded Multilayer Coatings on Large Flat Substrates*, G. Gutman, J. Keem, K. Parker, J.L. Wood, R. Watts, C. Tarrio SPIE vol. 1742 (1992) pp. 373-381.

*A Unified Geometrical Insight for the Design of Toroidal Reflectors with Multilayered Optical Coatings: Figured X–Ray Optics*, Gerald F. Marshall, SPIE vol. 563, Applications of Thin–Film Multilayered Structures to Figured X–Ray Optics (1985) pp. 114-134.

*Primary Examiner*—Craig E. Church
*Attorney, Agent, or Firm*—Harness, Dickey & Pierce, PLC

[57] ABSTRACT

An optical system for providing a steerable monochromatized source of x-ray or neutron radiation. The system incorporates a radiation source and a Bragg structure reflective optical element. A stage causes the optical element to move relative to the radiation source. Such movement is coordinated with lateral d-layer grading such that Bragg's law of reflection is satisfied for radiation of a given wavelength bandwidth to be reflected at various instances and departure angles.

20 Claims, 4 Drawing Sheets

5,757,882

1

STEERABLE X-RAY OPTICAL SYSTEM

FIELD OF THE INVENTION

The present invention relates to methods and apparatus for scanning of x-ray beams. More particularly, the present invention relates to reflective optical systems capable of scanning a collimated monochromatic x-ray beam with respect to a sample or detector.

BACKGROUND OF THE INVENTION

In many scientific devices there is a need to sweep an x-ray beam with respect to a sample. Examples of such devices include both x-ray and neutron analytical and imaging systems.

One approach toward sweeping a sample with an x-ray source involves the use of spaced slits which provide a collimated beam from the x-ray source. A sample can be moved relative to this source or the source can be moved relative to the sample. In either case, however, the beam is not monochromatized thus interfering with certain evaluations. In another system, a divergent beam from a radiation source is passed through a mask with a pin hole. The rays which emerge from the pin hole are nearly collimated and can be directed to a target for evaluation. This technique has a similar disadvantage of not being monochromatized and moreover the intensity available from using only a minor arch segment of the source output is very small. Furthermore, the movement precision and rate are limited by mechanical constraints.

As a means of providing a monochromatized beam, crystal or synthetic crystal structures can be provided which reflect the radiation using Bragg's law. Such Bragg structures only reflect radiation when Bragg's equation is satisfied:

$$n\lambda = 2d\sin(\theta)$$

where n = the order of reflection $\lambda$ = wavelength of the incident radiation d = layer-set spacing of a Bragg structure, or the lattice spacing of a crystal $\theta$ = angle of incidence The structure of a crystalline solid, a regular three dimensional array of atoms, forms a natural diffraction grating for x-rays. The quantity d in Bragg's equation is the perpendicular distance between the planes of atoms in the crystal. The construction of an artificial diffraction grating with a spacing on the order of the x-ray wavelength was impossible at the time W. L. Bragg derived his foundational equation. However, crystalline structures can now be imitated by thin film multilayers, so x-ray diffraction is no longer limited to structures with naturally occurring d spacings.

In order for a multilayer structure to reflect by imitating a crystal structure, a light element of lowest possible electron density is layered with a heavy element of highest possible electron density. The heavy element layer acts like the planes of atoms in a crystal, as a scatterer, while the light element layer behaves like the spacers between the planes of atoms. A further requirement of these two elements is that they do not interdiffuse.

Multilayer structures possess advantages over natural crystalline structures because by choosing the d spacing of a multilayer structure, devices may be fabricated for use with various wavelengths and incidence angles. Crystals also possess poor mechanical qualities such as resistance to scratching.

2

By varying the d spacing laterally across the surface, x-rays of the same wavelength can be reflected from every point on the surface, even where the angle of incidence changes across the surface. At each point, the angle of incidence and the d spacing are manipulated according to the Bragg's equation. Depth grading can also be used as a means for broadening of the band pass, therefore increasing the integrated reflectivity of a particular multilayer structure.

However, as shown above, Bragg's equation relates instant angle, crystal lattice spacing and wavelength. Thus a source beam striking the reflective optics reflects a beam within a certain wavelength region only at a particular departure angle. Due to the sensitivity of instance angle and wavelength, it is not ordinarily possible to move the mirror to change the direction of the departed beam which would be useful for example, to sweep a sample.

Thus, there is a need for an improved means of sweeping x-ray beams with respect to a sample. Furthermore, there is a need for a means for sweeping a collimated x-ray beam with respect to a sample accurately and at a high sweeping rate. There is a further need for a means for steering a collimated x-ray beam in which the beam intensity is not compromised by only using a minor arch segment of the source output.

SUMMARY OF THE INVENTION

The present invention provides an optical system for steering monochromatic collimated x-ray beams to be swept with respect to a sample. The embodiments of the present invention employ so called laterally graded multilayer mirrors in which the d spacing is varied along its surface. By simultaneously moving this reflective optical element to change the area of incidence of an x-ray beam on the reflective structure and the angle of incidence, the Bragg equation can be met at various incidence and departure angles for a particular wavelength bandwidth. Thus by moving the reflective optical element, an x-ray or neutron beam can be swept with respect to the sample.

One object of the present invention is to provide an improved means for sweeping x-ray beams with respect to a sample.

Another object of the present invention is to provide a reflective optical system capable of sweeping a collimated monochromatic x-ray beam with respect to a sample.

A still further object of the present invention is to provide a means for steering a collimated x-ray beam in which the beam intensity is not compromised by only using a minor arch segment of the source output.

In order to achieve the foregoing objects, the present invention provides an optical system having a Bragg structure for reflecting a collimated beam in accordance with Bragg's law. The Bragg structure is configured with lateral lattice spacing grading such that the d-layer spacing varies across the surface. The system is configured such that the Bragg structure (multilayer mirror) is movable relative to the collimated beam wherein the angle of incidence as well as the area of incidence between the collimated beam and the Bragg structure can be varied simultaneously in a precise manner. In operation, the Bragg structure is moved so that as the angle of incidence changes, the area of incidence also changes. The movement is calculated such that Bragg's law continues to be satisfied even as the angle of incidence varies. This is accomplished by simultaneously moving the area of incidence between the collimated beam and the Bragg structure to be at a location on the Bragg structure having a d-layer spacing which compensates for the change in the angle of incidence. Therefore, since the angle of incidence can be varied without violating Bragg's law by adjusting the d-layer spacing via the area of incidence, the Bragg structure will reflect the collimated beam at varying departure angles allowing the system to steer the reflected collimated beam to sweep a sample.

In a first embodiment, the Bragg structure is configured as a planar mirror in which the d-layer spacing decreases from one end of the mirror to the other end. In this embodiment, the radiation source remains stationary while the mirror is simultaneously rotated and translated, changing the angle of incidence and area of incidence respectively. In a second embodiment, the Bragg structure is configured as a circular disk divided into sections in which the surface of each section is formed as a circumferential partial parabolic cylinder and the d-layer spacing of each section decreases circumferentially in a clockwise direction. In this embodiment, the disk is rotated about it axis changing the angle of incidence and area of incidence, wherein each section produces a scan line which together act to "rake" the sample.

Further objects, features and advantages of the invention will become apparent from a consideration of the following description and the appended claims when taken in connection with the accompanying drawings.

BRIEF DESCRIPTION OF THE DRAWINGS

FIG. 4b is an exploded view of the parabolic cylinder shaped reflective surface of 4a;

FIG. 5a is a schematic view of the circular disk Bragg structure of FIG. 4a.

DETAILED DESCRIPTION OF THE PREFERRED EMBODIMENT

Preferred embodiments of the steerable x-ray optical systems of the present invention are described herebelow with reference to the drawings.

Figures 1, 2:
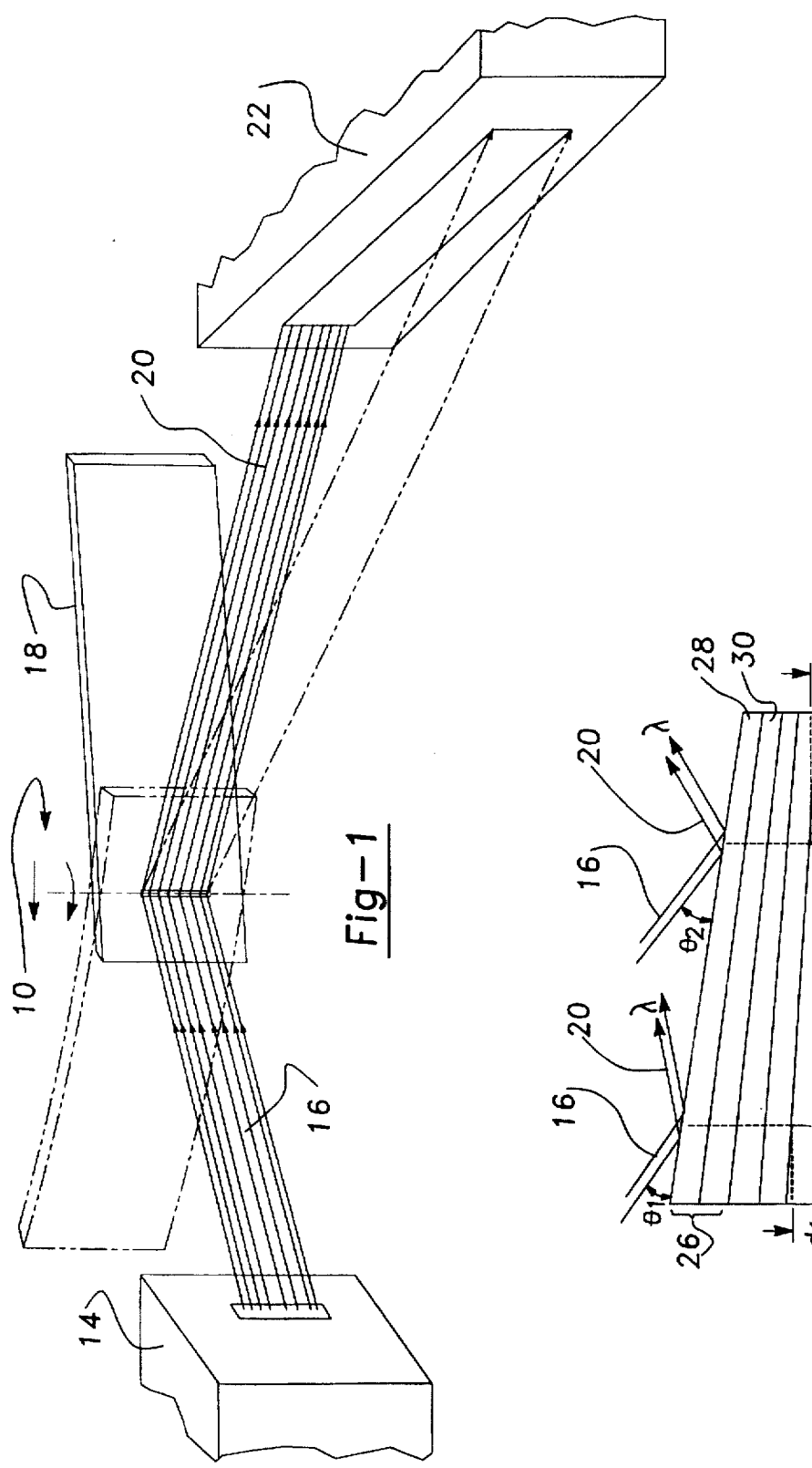
FIG. 1 is a schematic view of the first embodiment of the present invention including a planar mirror Bragg structure.
FIG. 2 is a cross-sectional schematic view of the planar mirror Bragg structure of FIG. 1 showing the d-layer spacing of the Bragg structure.

Referring to FIGS. 1 and 2, the optical system, referred to generally at 10, includes a radiation source (not shown) for producing radiation. A collimated polychromatic beam 16 from collimator 14 is reflected off a Bragg structure 18 producing a monochromatic x-ray beam 20 in accordance with Bragg's law. The collimator 14 can be configured as plates or slots through which the radiation is passed, or Gutman optics comprising a series of curved reflective mirrors which produce a collimated beam. Alternatively, a parallel beam from Synchrotron can be used to produce a collimated beam. In order to sweep a sample 22, the Bragg structure 18 is simultaneously translated and rotated by an actuator (not shown). By rotating the Bragg structure 18, the angle of incidence is varied, by translating the Bragg structure 18, the area of incidence is varied.

Methods for producing multilayered thin film optical elements are known in the art and one such method is disclosed in commonly owned U.S.patent application Ser. No. 08/487,936, filed on Jun. 7, 1995, which is incorporated herein by reference. By varying the d-layer spacing laterally across the surface of the Bragg structure 18, x-rays of the same wavelength can be reflected from every point on the surface as the angle of incidence changes. At each point, the angle of incidence and the d-layer spacing can be manipulated to satisfy Bragg's law. Depth grading can also be used as a means for broadening of the band pass, therefore increasing the integrated reflectivity of the multilayer structure.

Since Bragg's law relates d layer spacing and angle of incidence to wavelength, it is possible, by tuning the Bragg structure as described above, to produce a monochromatic reflected beam. However, with depth grading, it is possible to broaden the band pass of the reflected beam such that the reflected beam may be comprised of multiple wavelengths if desired.

In a first embodiment, the Bragg structure 18 is configured as a planar mirror having lateral lattice spacing grading such that the lattice (d-layer) spacing gradually decreases from one end of the structure to the other end. The planar mirror is made up of a substrate 24 upon which a plurality of layer sets are produced. Each layer set 26 is made up of two separate layers of different materials: one with a relatively high atomic number 28 and one with a relatively low atomic number 30. The high electron density layer 28 behaves like the plane of atoms in a crystal, while the low electron density layer 30 is analogous to the space between the planes. The layer set thickness, or d-layer spacings, of the multilayers are on the order of one to a few wavelengths of the desired source. From about 10 to 1000 thin film layers may be deposited on a substrate, depending on the desired qualities of the multilayer structure.

In order to produce a monochromatic x-ray beam 20, Bragg's law relating d-layer spacing and the angle of incidence must be satisfied. By laterally grading the d-layer spacing, the angle of incidence required to produce the monochromatized x-ray beam 20 changes as the area of incidence between the collimated beam 16 and the Bragg structure 18 changes.

FIG. 2 shows a cross-sectional view of the multilayer planar mirror having laterally graded layers deposited on the substrate 24, where x-rays encounter the multilayer structure with angles of incidence equal to $\theta_1$ and $\theta_2$. The multilayers in FIG. 2 are graded having a lattice spacing of $d_1$ near one end of the mirror which decreases to a lattice spacing of $d_2$ near the other end. At an angle of $\theta_1$, a d-layer spacing of $d_1$ is required to produce a monochromatic x-ray beam 20 having a wavelength of $\lambda$ according to Bragg's law. At an angle of $\theta_2$, a d-layer spacing $d_2$ is required to produce a monochromatic x-ray beam 20 having a wavelength of $\lambda$ according to Bragg's law.

Figure 3A:
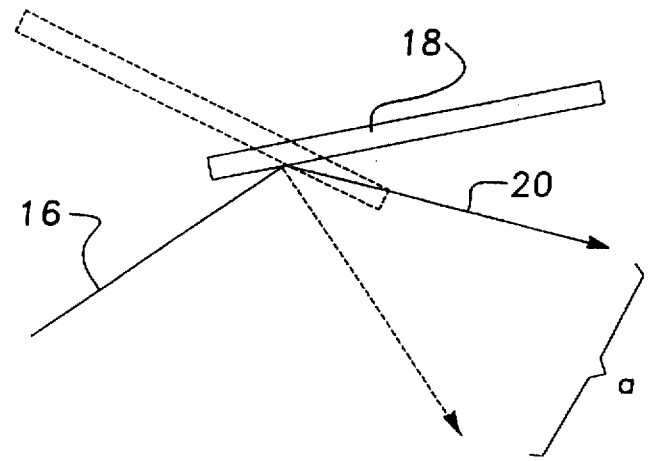
FIG. 3a is a schematic top view of the embodiment of FIG. 1 showing the Bragg structure being rotated and translated.

In this embodiment, the actuator is configured to simultaneously rotate and translate the Bragg structure 18 in a calculated manner so that the d-layer spacing at the area of incidence always relates to the angle of incidence so as to satisfy Bragg's law. As shown in FIG. 3a, the distance between the radiation source and the area of incidence remains constant. By maintaining the relationship between d-layer spacing and angle of incidence, a monochromatic x-ray beam 20 having a wavelength of λ is produced. Furthermore, the monochromatic x-ray beam 20 can be steered by altering the angle of incidence, which in turn alters the angle of departure of the beam, in a controlled manner causing the sample 22 to be swept a distance of "a" by the reflected monochromatic x-ray beam 20.

Figure 3B:
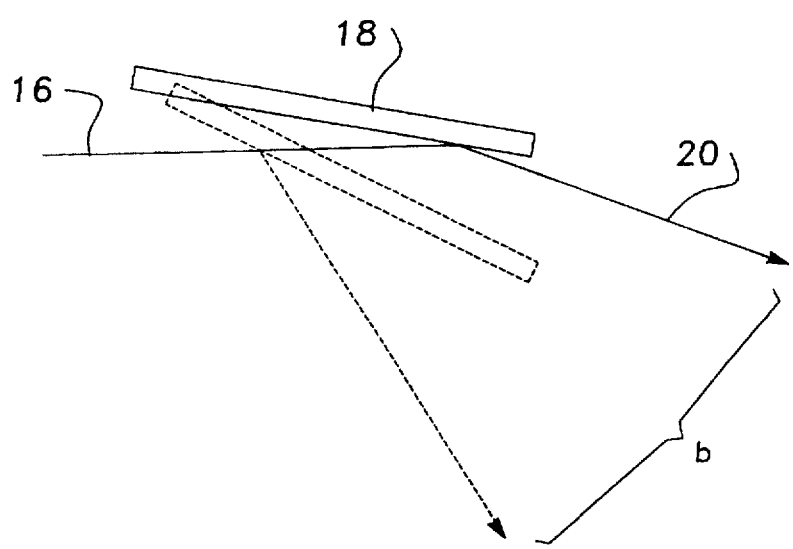
FIG. 3b is a schematic top view of the embodiment of FIG. 1 showing the Bragg structure being rotated about one end.

Alternatively, the actuator can be configured to merely rotate the Bragg structure 18 about an end in a calculated manner so that the d-layer spacing at the area of incidence always relates to the angle of incidence so as to satisfy Bragg's law. As shown in FIG. 3b, the distance between the radiation source and the area of incidence varies as the Bragg structure 18 is rotated. The angle of incidence and the area of incidence both vary as the Bragg structure 18 is rotated. By maintaining the relationship between d-layer spacing and angle of incidence, a monochromatic x-ray beam 20 having a wavelength of λ is produced. Furthermore, the monochromatic x-ray beam 20 can be steered by altering the angle of incidence, which in turn alters the angle of departure of the beam, in a controlled manner causing the sample 22 to be swept a distance of "b", which is greater than distance "a" shown in FIG. 3a, by the reflected monochromatic x-ray beam 20. Therefore, it is possible to sweep a greater region using the configuration illustrated in FIG. 3b.

In a second embodiment, as shown in FIGS. 4a, 4b and 5a–5d, the Bragg structure 18' is configured as a multilayer circular disk having lattice spacing which varies circumferentially around the disk such that the lattice (d-layer) spacing gradually decreases in a clock-wise direction. As in the previous embodiment, the circular disk is made up of a substrate upon which a plurality of layer sets are produced, each layer set comprising two separate layers of different materials.

Figure 4A:
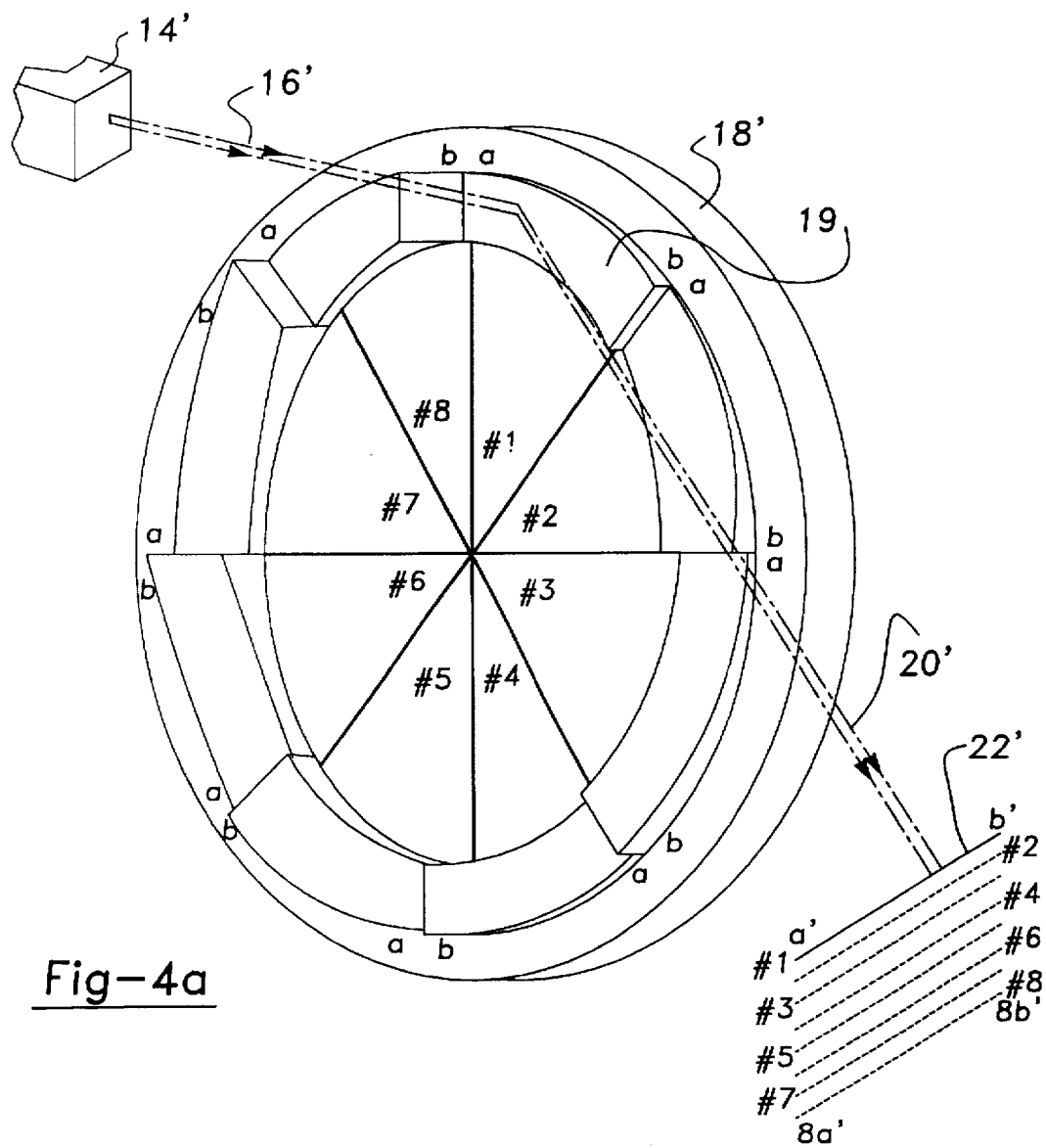
FIG. 4a is a schematic view of the second embodiment of the present invention showing the parabolic cylinder shape reflecting portion of the Bragg structure.
Figure 4B:
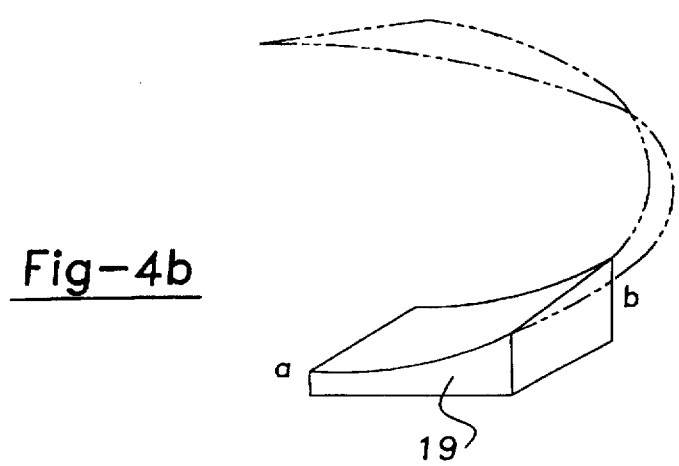

As shown in FIGS. 4a and 4b, the circular Bragg structure 18' is divided into sections, each section having a circumferential partial parabolic cylinder shaped reflective surface 19 at the point where the collimated beam 16' strikes the Bragg structure 18'. The d-layer spacing in each section is laterally graded in a clockwise circumferential manner wherein the d layer spacing at point "a" of every section is smaller than the spacing at point "b".

In this embodiment, the actuator is configured to rotate the circular disk about its axis in a counter-clockwise direction, as show by arrow 32 in FIG. 4a, in a calculated manner so that the d-layer spacing at the area of incidence always relates to the angle of incidence so as to satisfy Bragg's law. By maintaining the relationship between d-layer spacing and angle of incidence, a monochromatic x-ray beam 20' having a wavelength of λ' is produced. Furthermore, the monochromatic x-ray beam 20' can be steered by altering the angle of incidence, which in turn alters the angle of departure of the beam, in a controlled manner causing the sample 22' to be swept by the reflected monochromatic x-ray beam 20'.

Figure 5A:
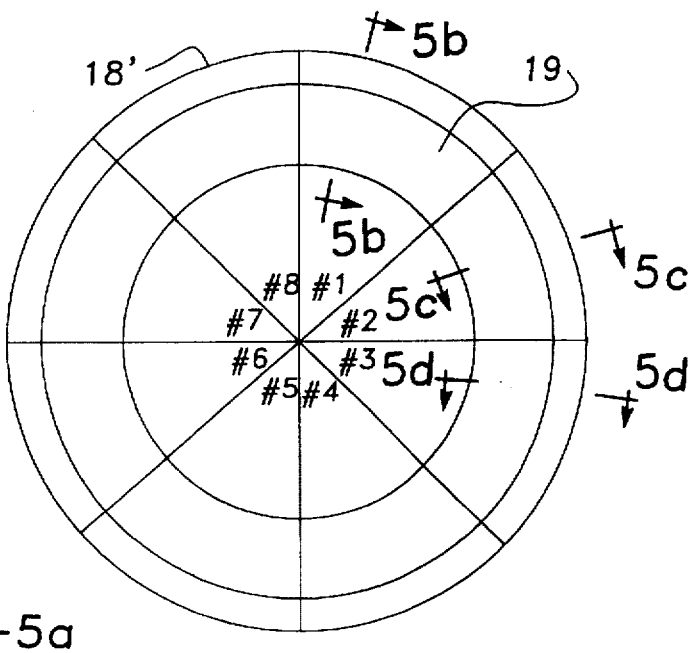
Figure 5B:
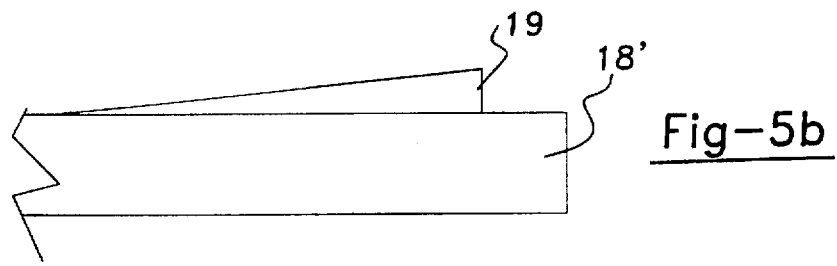
FIGS. 5b–5d are exploded cross-sectional view of the Bragg structure of FIG. 6a taken along lines, 5b, 5c, and 5d, respectively.
Figure 5C:
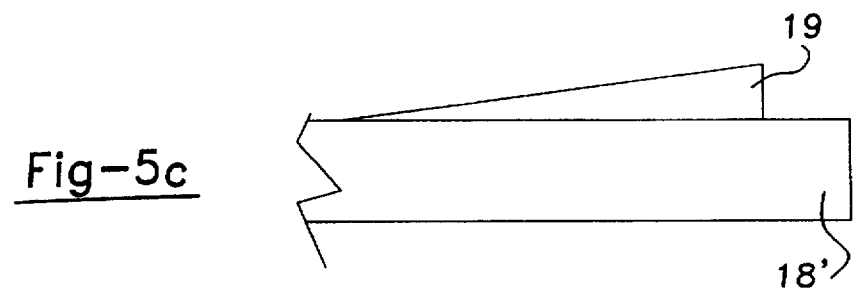
Figure 5D:
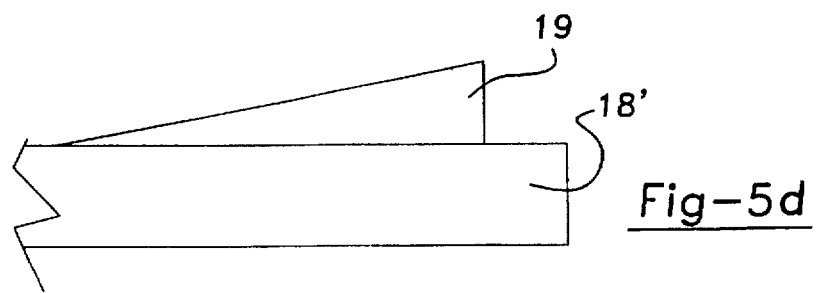

FIGS. 5a–5d show the reflecting surface of the Bragg structure 18' as also being radially sloped from the center of the disk radially outward. The cross-sectional views of FIGS. 5b–5d illustrate that the radial slope of each subsequent section increases. This enables the Bragg structure 18' to reflect light in a rasterizing manner as described below.

In operation, as the Bragg structure 18' is rotated in a counter-clockwise direction by the actuator, the angle of incidence of the collimated beam 14' varies as the area of incidence between the beam 14' and Bragg structure 18' varies, as a result of the circumferential partial parabolic cylinder shape 19 of each section. The lateral d-layer spacing grading of each section is calculated, according to Bragg's law, to account for the change in angle of incidence. Therefore, a monochromatic x-ray beam 20', of wavelength λ', is reflected from the Bragg structure 18' in a controlled manner allowing the monochromatic beam 20' to be steered to sweep a sample. The varying radial slope of each subsequent section can be used to "step" the sweep area of the monochromatic beam 20' to an area adjacent to the previous section's sweep area allowing the system to operate as an x-ray raster.

For example, as illustrated in FIG. 4a, as the Bragg structure 18' is rotated in a counter-clockwise direction, the area of incidence of the collimated beam 14' moves from point b, in section #1, toward point a. As the area of incidence changes, a monochromatic x-ray beam is reflected in a controlled manner sweeping a sample 22' from point b' to point a'. Since the circumferential partial parabolic cylinder shape 19 repeats itself in each section, as the Bragg structure 18' continues to rotate moving the area of incidence from point a in section #1 to point b in section #8, the reflected monochromatic beam 20' jumps back to position b' on the sample 22'. However, due to the increased radial slope of section #8 of the Bragg structure 18', the reflected monochromatic beam 20' is reflected downward to the area labeled 8b' of the sample 22'. Again, as the area of incidence in section #8 moves from point b to point a, the reflected monochromatic beam 20' is steered from point 8b' to 8a' on the sample 22' due to the variation in the angle of incidence. As the area of incidence moves from section #8 to section #7 the process repeats itself with the reflected monochromatic beam 20' being "stepped" up to sweep line 7 due to the decrease in radial slopping of section #7.

The stepping and sweeping process is continually repeated as the Bragg structure 18' continues its counter-clockwise rotation. Therefore, the system can be configured to act as an x-ray raster which "rakes" the sample 22' with a monochromatic x-ray beam 20'.

It is to be understood that the invention is not limited to the exact construction illustrated and described above, but that various changes and modifications may be made without departing from the spirit and scope of the invention as defined in the following claims.

We claim:

1. An optical system for providing a steerable monochromatic x-ray or neutron beam from a radiation source, the system comprising:

means for producing a collimated beam from said radiation source;

a Bragg structure placed at a distance from said radiation source for reflecting said collimated beam in accordance with Bragg's law, said Bragg structure having lateral lattice spacing grading, whereby x-rays or neutron beams of the same wavelength will be reflected from substantially every point on the Bragg structure having said beam incident thereon; and means for moving said Bragg structure relative to said collimated beam and in the direction of the gradient of the lateral d-layer spacing causing the incidence angle between said collimated beam and said Bragg structure to change and simultaneously causing the area of incidence between said collimated beam and said Bragg structure to change such that at said area of incidence the lattice spacing of said Bragg structure always relates to said angle of incidence in a manner which satisfies Bragg's law, the Bragg structure further configured with the length of the area of incidence being more than an order of magnitude less the length of said graded Bragg structure in the direction of movement, whereby said collimated beam is reflected in a controlled manner such that the monochromatic x-ray or neutron beam can be steered by varying said angle of incidence by said system.

2. An optical system according to claim 1, wherein said Bragg structure comprises a laterally graded multilayer planar mirror wherein said lattice spacing varies from one end of said mirror to an opposite end of said mirror.

3. An optical system according to claim 2, wherein said means for moving simultaneously rotates and translates said mirror causing said incidence angle and said area of incidence between said collimated beam and said mirror to simultaneously vary such that at said area of incidence the lattice spacing of said mirror always relates to said angle of incidence in a manner which satisfies Bragg's law, whereby said collimated beam is reflected in a controlled manner such that the monochromatic x-ray beam can be steered by varying said angle of incidence by said system.

4. An optical system according to claim 1, wherein said Bragg structure comprises a laterally graded multilayer circular disk having an axis said Bragg structure being divided into section wherein each section has a circumferential partial parabolic cylinder shaped surface and said lattice spacing varies circumferentially around each section.

5. An optical system according claim 4, wherein said means for moving rotates said disk around said axis causing said incidence angle and said area of incidence between said collimated beam and said disk to simultaneously vary, due to said circumferential partial parabolic cylinder shaped sections, such that at said area of incidence the lattice spacing of said disk always relates to said angle of incidence in a manner which satisfies Bragg's law whereby said collimated beam is reflected in a controlled manner such that the monochromatic x-ray beam can be steered by varying said angle of incidence by said system.

6. An optical system according to claim 5, wherein said section surfaces are further radially sloped such that said section slope is constant within each section but increases circumferentially in a clockwise manner for each adjacent section so that each adjacent section sweeps a section of the sample adjacent to the previous section causing said optical system to act as an x-ray rasterizer.

7. An optical system according to claim 1 wherein said distance between said radiation source and said point of incidence remains constant as said Bragg structure moves.

8. An optical system according to claim 1, wherein said distance between said radiation source and said point of incidence varies as said Bragg structure moves.

9. An optical system according to claim 1, wherein said Bragg structure further having depth grading for broadening the band pass of the reflected beam.

10. An optical system for providing a steerable, monochromatic X-ray or neutron beam from a radiation source, the system comprising:

a collimator for producing a collimated polychromatic beam from said radiation source;

a Bragg structure positioned in radiation receiving relation to said collimator such that said collimated beam is reflected off said Bragg structure as one of said monochromatic x-ray or neutron beam in accordance with Bragg's law;

said Bragg structure including lateral lattice spacing such that a d-layer spacing varies laterally thereacross, whereby x-rays or neutron beams of the same wavelength will be reflected from substantially every point on the Bragg structure having said beam incident thereon; and an actuator for moving said Bragg structure relative to said collimated beam such that an angle of incidence and an area of incidence of said collimated beam on said Bragg structure are simultaneously varied so as to satisfy Bragg's law, whereby said collimated beam is reflected in a controlled manner such that said monochromatic x-ray or neutron beam can be steered by varying said angle of incidence using said actuator.

11. The system of claim 10 wherein said Bragg structure comprises a laterally graded multilayer planar mirror wherein said d-layer spacing gradually decreases from one end of said mirror to another end of said mirror.

12. The system of claim 11 wherein said actuator simultaneously rotates and translates said Bragg structure so that said d-layer spacing at said area of incidence always relates to said angle of incidence so as to satisfy Bragg's law.

13. The system of claim 11 wherein said actuator rotates said Bragg structure about one of said end and said another end so that said d-layer spacing at said area of incidence always relates to said angle of incidence so as to satisfy Bragg's law.

14. The system of claim 10 wherein said Bragg structure comprises a laterally graded multi-layer circular disk wherein said d-layer spacing decreases circumferentially around said disk in one of a clockwise or counterclockwise direction.

15. The system of claim 14 wherein said disk is divided into a plurality of sections, each section having a circumferential partial parabolic cylinder shaped reflective surface and a lateral d-layer spacing circumferentially decreasing in one of a clockwise or counterclockwise direction from one end of said section to another end of said section.

16. The system of claim 15 wherein each of said sections is radially sloped with respect to a center of said disk such that said Bragg structure reflects said beam in a rasterizing manner.

17. The system of claim 16 wherein said rasterizing includes stepping a sweep area of said reflected beam to an area adjacent a previous section sweep.

18. The system of claim 14 wherein said actuator rotates said disk in one of said clockwise or counterclockwise directions such that said d-layer spacing at said area of incidence always relates to said angle of incidence so as to satisfy Bragg's law.

19. The system of claim 10 wherein a distance between said radiation source and said area of incidence remains constant as said Bragg structure moves.

20. The system of claim 10 wherein a distance between said radiation source and said area of incidence is varied as said Bragg structure moves.

* * * * *